Oct. 16, 1951 V. E. ACKLES 2,571,646
TRAY DELIVERY MECHANISM
Filed Dec. 11, 1946 3 Sheets-Sheet 1
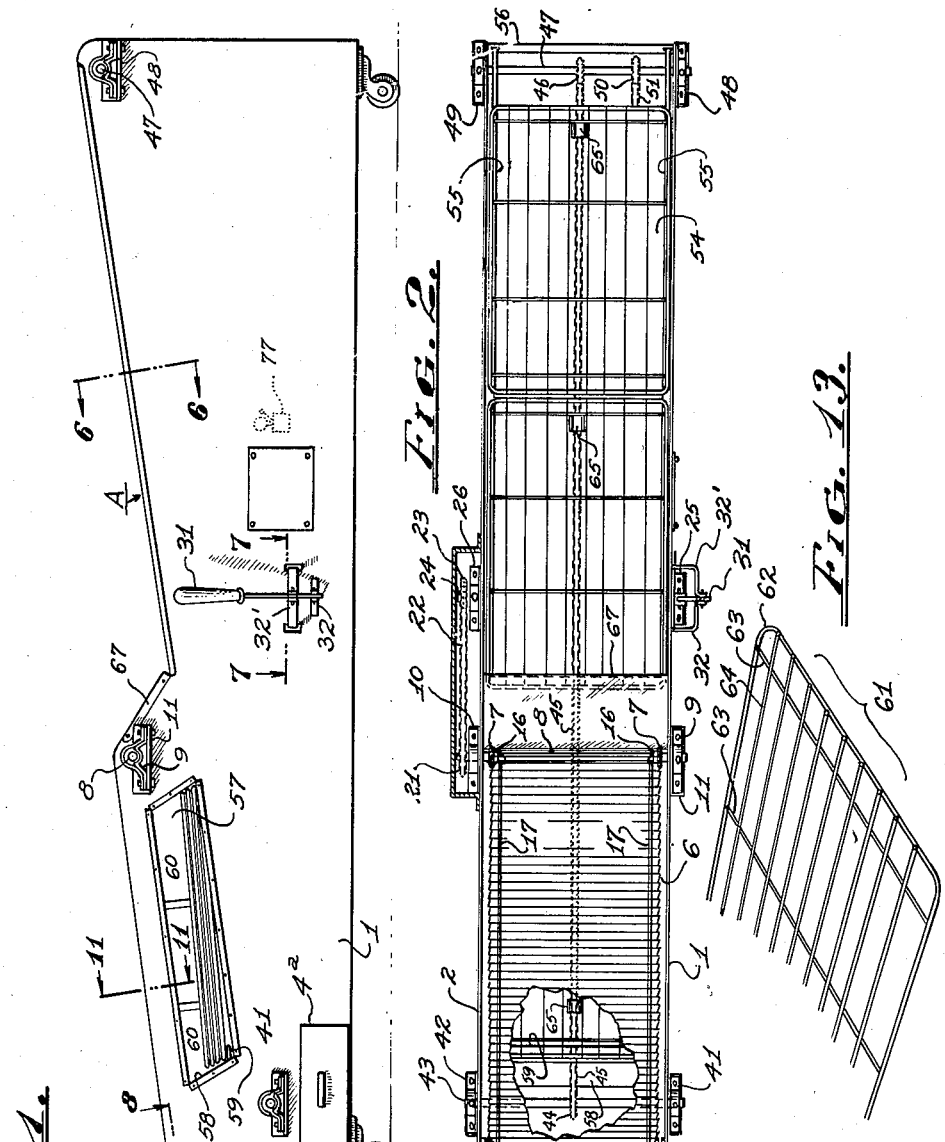
Inventor
VIRGIL E. ACKLES
By R. S. Berry
Attorney Oct. 16, 1951    V. E. ACKLES    2,571,646
TRAY DELIVERY MECHANISM
Filed Dec. 11, 1946    3 Sheets-Sheet 2
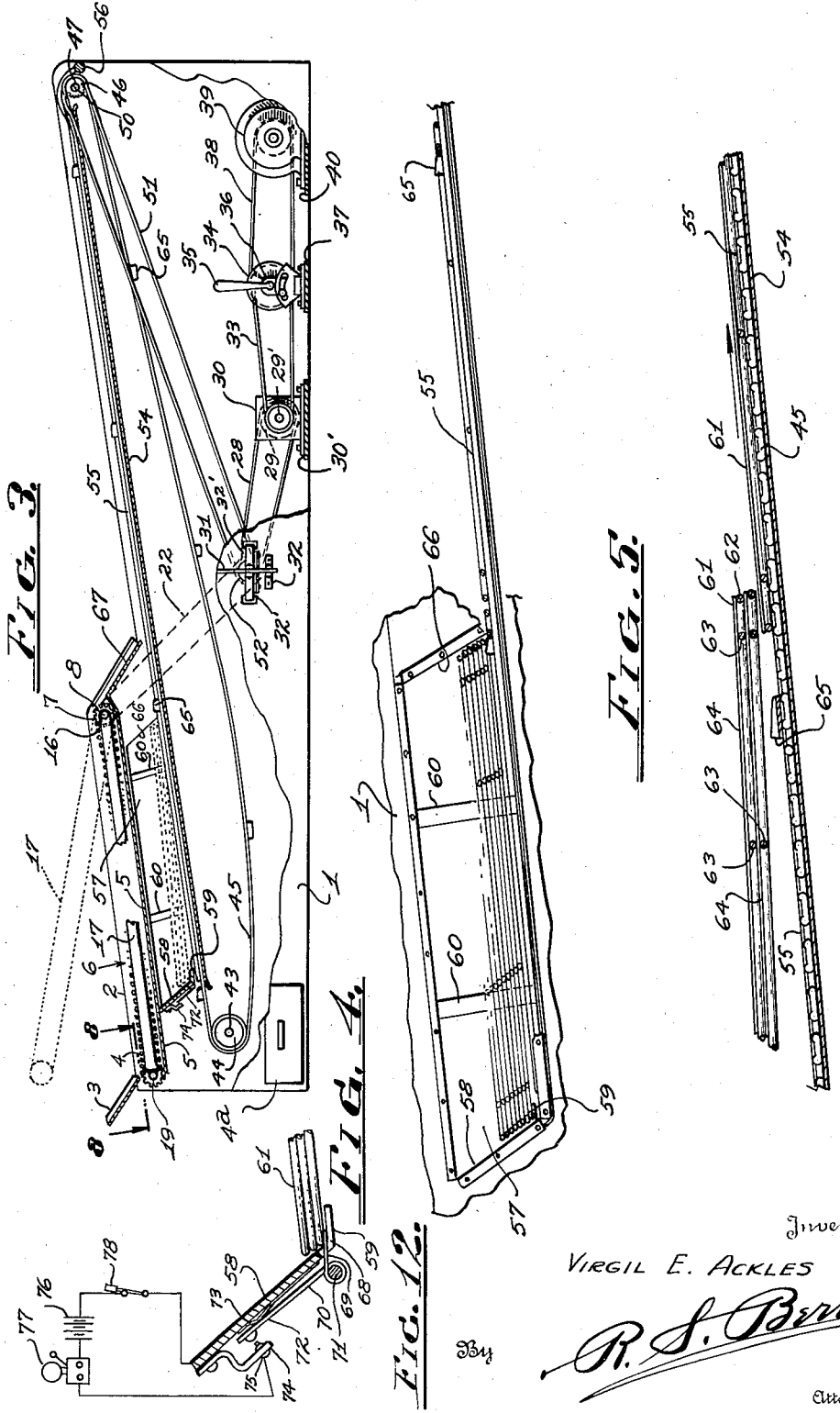

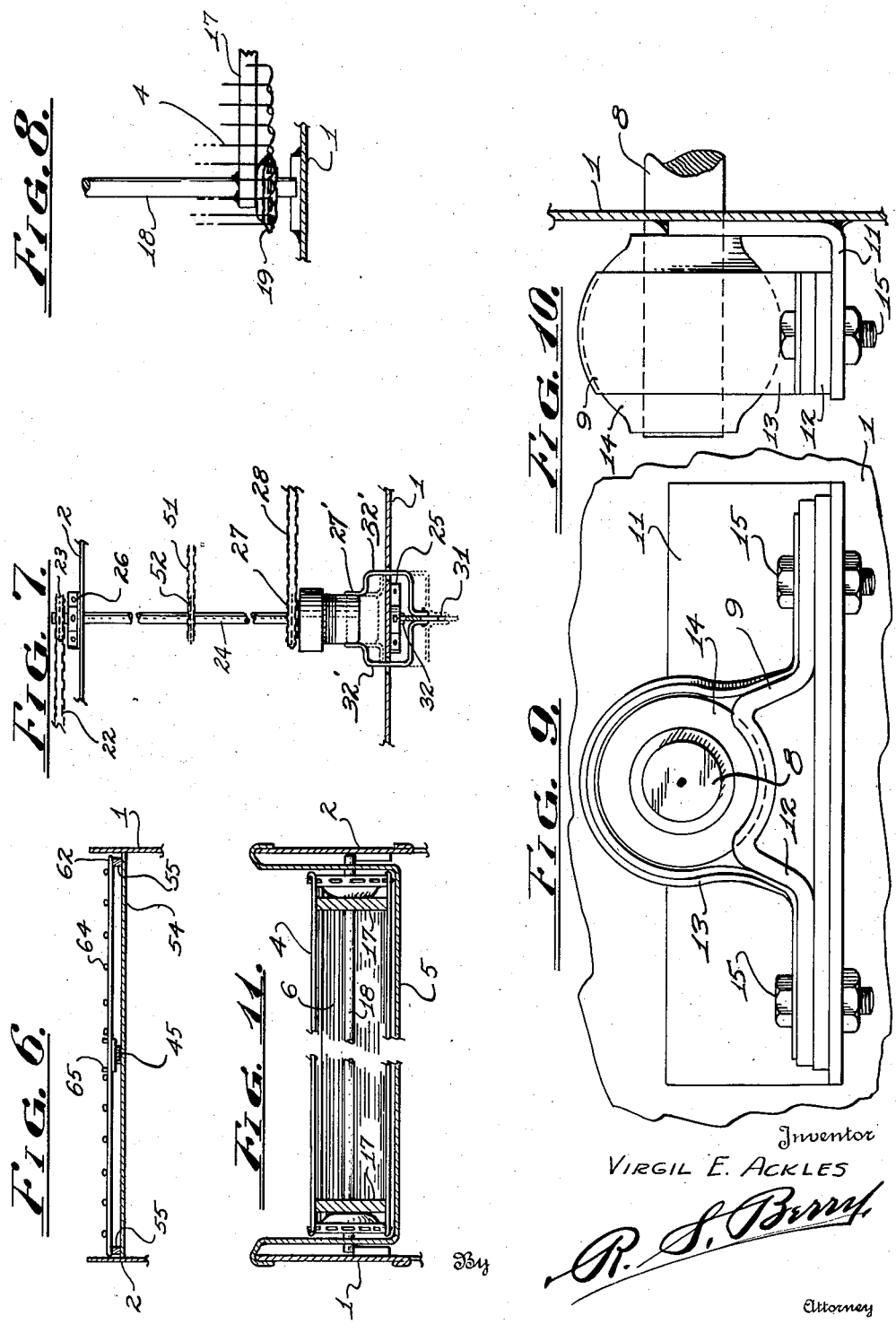

Patented Oct. 16, 1951

2,571,646

UNITED STATES PATENT OFFICE 2,571,646

TRAY DELIVERY MECHANISM

Virgil E. Ackles, Los Angeles, Calif., assignor to Doughnut Corporation of America, New York, N. Y., a corporation of New York Application December 11, 1946, Serial No. 715,381

1 Claim. (Cl. 198—35)

This invention relates to an organized apparatus useful in the commercial production of doughnuts and the like and particularly to a device constructed and arranged to deliver a succession of trays in timed sequence to receive doughnuts being delivered in a constant stream from a cooking apparatus.

In the commercial production of doughnuts the cooking operation is generally accomplished in a long relatively narrow vat of heated cooking oil in one end of which the rings of dough are dropped and along the bottom of which means is provided to cause the doughnuts to progress along the vat together with means at the midpoint of travel to turn the doughnuts over to accomplish cooking on the reverse side. Generally, such devices at the delivery end are equipped with an inclined conveyor constructed and arranged to deliver the cooked doughnuts out of the vat into baskets after which they are placed by hand on trays and the loaded trays are then put in suitable racks to await further processing such as glazing, icing and the like.

This method of handling has the disadvantage that when the freshly cooked doughnuts are thus piled up in a basket, the weight of the upper ones frequently crushes the lower ones so that they are unsaleable. This is especially true of the raised type of doughnut.

Heretofore, the placing of the cooked doughnuts on trays has been entirely a manual operation including the placing of the tray on a table loading it with a layer of doughnuts and then transferring the tray to a rack.

To simplify this operation it is an object of this invention to provide an organized apparatus at the delivery end of a doughnut cooking vat which will deliver a series of trays in succession in such position and in such timed sequence that each tray will be completely filled with cooked doughnuts so that the attendant is required merely to pick up the trays as they are filled and to transfer them to a rack for further processing.

It is a further object of the invention to provide an organized apparatus constructed and arranged to be disposed at the delivery end of a doughnut cooking machine and adapted to receive the cooked doughnuts and to convey them to a position where they will be delivered in timed sequence to a series of moving trays.

A still further object of the invention is to provide a tray delivering and filling apparatus in which a single power means is employed to deliver the doughnuts and the trays with an incorporated speed changing device whereby the speed with which the trays are delivered can be correlated to the rate of delivery of doughnuts from the cooking apparatus to the end that each tray will be completely filled.

Still another object of the invention is to provide an apparatus of the above described character which is so constructed and arranged as to permit supplies of empty trays to be added from time to time without stopping the operation of the machine.

Still another object of the invention resides in the provision in an organized apparatus of the above character of devices operable automatically to warn the attendant when the stack of trays are exhausted.

A still further object of the invention is to provide an apparatus of the above described character which is simple and economical in construction, reliable in operation and which is easy to keep clean.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of an exemplary form of apparatus incorporating the invention, Fig. 2 is a top plan view of Fig. 1, Fig. 3 is a side elevation similar to Fig. 1 but with the side broken away to show principles of interior construction, Figs. 4 and 5 are enlarged fragmentary sectional views showing the operation of the tray delivering apparatus at different stages of the operation of picking up a tray, Figs. 6, 7 and 8 are fragmentary transverse sectional views taken on the lines 6—6, 7—7 and 8—8 respectively of Fig. 1, Figs. 9 and 10 are end and side elevations of a typical bearing mounting, Fig. 11 is a fragmentary section taken on the line 11—11 of Fig. 1, Fig. 12 is an enlarged view of the warning signal operating means, and Fig. 13 is a perspective view of a portion of a tray adapted for use in the apparatus.

In the mode of execution of the invention disclosed in the drawings, the apparatus comprises a frame structure A of generally rectangular cross section and of considerable length. Preferably it is constructed of sheet metal sides 1 and 2 and a series of top and bottom cross pieces bolted, riveted or welded together to form a unitary structure. Additionally, the frame structure is so disposed as to serve as supporting means for the operating devices comprising a motor and other devices presently to be described. At one end the upper surface carries a downwardly inclined, wide, shallow trough or chute 3 adapted to receive doughnuts discharged from a cooking apparatus and to cause them to slide down onto the upper surface of fixed inclined conveyor 4 extending along the upper surface of the structure and being somewhat higher at its delivery end than at its receiving end. Excess cooking oil dripping from the doughnuts will fall off the end of the chute 3 into a collecting tank 4a mounted in the structure in the form of a drawer. As best shown in Fig. 3, the side walls 1 and 2 and the top portion 5 of the frame structure combine to form a shallow recess 6 enclosing the sides and extending underneath the conveyor 4. The conveyor 4 is formed of an endless belt of well known construction comprising a series of transverse bars having their ends interlinked to form a chain, the interstices between adjacent bars being engaged by suitable driving sprockets 7—7 on the shaft 8 which shaft is journalled for rotation in suitable self aligning bearings 9 and 10 affixed to the frame work of the frame structure A. Referring to Figs. 9 and 10 the shaft 8 protrudes through an opening in the side piece 1 and through a registering clearance in the vertically disposed flange of an angle iron 11 welded to the side piece 1. Mounted on the horizontal flange of the angle iron is a bearing assembly comprising seat and cap members 12 and 13 surrounding and securing a bearing sleeve 14 in which the shaft 8 is journalled and which sleeve on its exterior surface is spherical so that the bearing is self-aligning. Bolts 15 connect the bearing assembly to the horizontal leg of the angle iron. In referring to other bearings those referred to as self-aligning will be understood to be of the same general character as above described in detail.

Journalled on the shaft 8 adjacent the proximate sides of the sprockets 7—7 are a pair of collars 16—16 each of which collars has affixed thereto one end of a pair of spacing bars 17—17 the other ends of which are fixed to a stationary shaft 18 on which adjacent the bars 17—17 a pair of sprockets 19—19 are journalled. The sprockets are the same as the sprockets 7—7 and engage the same interstices in the conveyor 4. By reason of this construction the conveyor 4 can be swung about the axis of the shaft 8 as shown in dotted lines in Fig. 3 for the purpose of cleaning the top portion 5 which forms the bottom of the recess 6 in which the conveyor operates.

The shaft 8 protrudes beyond the self-aligning bearing 10 and carries a sprocket 21 which is connected by a chain 22 to a sprocket 23 fixed to the end of a shaft 24 journalled in self-aligning bearings 25 and 26 carried by the side pieces 1 and 2 respectively. Intermediate its ends the shaft 24 carries a sprocket 27 freely rotatable thereon which sprocket is connected by a chain 28 to a sprocket 29 on the driven shaft 29' of a speed reduction unit 30 of any suitable type and the speed reducer is mounted on a cross member 30' interconnecting the lower ends of the side pieces 1 and 2. The sprocket 27 serves additionally as the driving side of a friction clutch assembly 27' the driven side of which is fixed to the shaft 24 adjacent the bearing 25 as indicated in Fig. 7. A hand lever 31 pivoted to a bracket 32 depending from the bearing 25 and connected by links 32'—32' to the driving portion of the clutch assembly provides a means of disconnecting and connecting the shaft 24 with the source of power at the will of the operator.

The speed reducer is connected by a belt 33 to the driven side of a variable speed unit 34 which is of common design and which may be varied by adjustment of the handle 35 about the axis of the shaft 36. The variable speed unit like the speed reducer is mounted on a bottom cross member 37 interconnecting the side pieces 1 and 2. The driven side of the variable speed unit is connected by a belt 38 to an electric motor 39 also mounted on a cross member 40. If desired, the motor 39 may be a variable speed motor with consequent elimination of the variable speed unit. Also the speed reduction unit here shown as a separate unit may be supplanted by a motor having a built-in reduction unit or the friction clutch here shown mounted on the shaft 24 may be combined with the motor, all without departure from the principles of the invention; it being necessary only to have a source of power with capacity for infinite variation of speed and capacity for instantaneous starting and stopping. Preferably, as here shown, the various elements are such as can be purchased on the open market.

Journalled in self-aligning bearings 41 and 42 carried by the side pieces 1 and 2 respectively is a shaft 43 which intermediate the bearings carries a sprocket 44 connected by an endless chain 45 with a sprocket 46 fixed to a shaft 47 which in turn is journalled in self-aligning bearings 48 and 49 carried by the side pieces 1 and 2 at the extreme outer and upper end of the frame structure. The shaft 47 between the sprocket 46 and the bearing 48 has fixed thereto a sprocket 50 which is connected by a chain 51 to a sprocket 52 fixed to the shaft 24. Thus it is that power generated by the motor 39 is transmitted to the clutch 27' and upon engagement of the clutch the conveyor 4 and the chain 45 will be simultaneously operated with the upper portions thereof moving in the same direction.

Fixed to the side pieces 1 and 2 and underlying the upper chain 45 is a sheet metal plate 54 which extends substantially the entire distance between the shafts 43 and 47. The plate 54 adjacent each edge thereof carries a pair of rails 55—55 the outer ends of which extend beyond the end of the plate 54 over the shaft 47 and thence curve downwardly and are fixed as by welding to a cross member 56 extending between the side pieces 1 and 2.

Immediately below the top portion 5 of the frame structure, the side pieces 1 and 2 are provided with opposed trapezoidal shaped openings 57—57, the portions of the side pieces forming the lower edges of said openings extending substantially parallel to and slightly above the plate 54 and the rails 55—55 carried thereby. A cross member 58 projects downwardly from the underside of the portion 5 and extends thereacross at the rear ends of the openings 57—57 and at its bottom edge terminates in a forwardly extending lip portion 59. A pair of bars 60—60 extends across the opening 57 in the side piece 2.

Referring to Fig. 13 there is shown a rack or tray 61 of the type particularly adapted for use with the invention. This tray comprises a main frame member 62 in the form of a round corner rectangle of heavy wire or rod provided with a series of co-planar cross members 63. Lying on top of the ends of the frame member 62 and the cross members 63 is a series of spaced parallel wires or rods 64, the whole assembly of frame member, cross members and rods being welded together to form an integral structure. In use, a quantity of trays 61 are stacked together and inserted in the opening 57 in the side piece 1 with the rear end of the bottom tray resting on the lip or ledge 59 and the front edge thereof resting on the rails 55—55. The rails are of sufficient heighth so that the front end of the tray frame is held clear of the chain 45. At spaced intervals, the chain 45 is provided with tray-engaging lugs 65 in the form of vertically disposed metal plates arranged on each side of the chain. As the chain advances, a pair of lugs will engage the forward end of the bottom tray of the stack and pull it forward. The remaining trays will engage a cross member 66 at the forward end of the opening 57 and will be restrained from moving and during the first part of movement of the bottom tray the rear end will be pulled free of the ledge 59 and will drop down on the rails 55—55 and then will be drawn along the rails toward their outer ends. When the rear end of the tray passes beneath the front end of the stack, the stack will drop down with the front end of the next tray engaging the rails 55—55 for engagement by the next set of lugs on the chain 45.

Incident to this movement, the trays pass beneath a chute 67 extending between the side pieces 1 and 2 and leading downwardly from beneath the upper end of the conveyor 4 and down which doughnuts delivered from the conveyor 4 slide. The forward movement of the tray and of the conveyor 4 is so timed that as the tray passes beneath the chute 67 it will be covered by a single layer of doughnuts. The lugs 65 on the chain 45 are so spaced that a minimum of space exists between adjacent trays. As each tray approaches the end of the apparatus an attendant picks out any defective doughnuts and then picks up the tray and its load and places it in a rack for cooling and for subsequent processing of the doughnuts thereon. From time to time the attendant supplies more racks to the pile in the opening 57, the speed of the machine being such that this incidental operation can be performed without a serious interruption of the work of the removal of filled trays.

Referring now to Fig. 12, there is shown in enlarged form a warning device operable automatically to warn the attendant when the stack of trays is exhausted. As here shown the lip 59 of the cross member 58 intermediate its ends is provided with a transverse slot 68 into which extends an arm 69 of a bell crank member 70 pivoted to the cross member 58 at 71. The other arm 72 of the bell crank extends upwardly along the rear face of the cross member 58 and as viewed in Fig. 12 it is normally urged in a counter-clockwise direction by a leaf spring 73 one end of which is riveted or otherwise fixed to the cross member 58. Overlying the free end of the arm 72 is a bracket member 74 the free end of which carries an electrical contact member 75 which is insulated from the bracket member. Connected to the contact member 75 is one side of an electrical circuit including a source of energy such as a battery or transformer 76 and a bell 77, the other side of the circuit being grounded to the frame. The strength of the spring 73 is sufficiently weak to be overcome by the weight of a single tray resting on the ledge or lip 59 with resultant opening of the electric circuit. When the last tray of a stack has been removed by the chain 45 the spring 73 will cause the arm 72 to engage the contact point 75 closing the circuit and causing the bell or other warning signal operated thereby to operate until a fresh stack of trays is inserted in the machine which then will automatically open the circuit and thus disable the signal. Preferably also the warning circuit will include a manually operated switch 78 by which the circuit is disabled when the machine is idle. Also in place of the battery here shown the warning signal circuit may be energized from the power line for the driving motor by the interposition of the usual bell transformer.

It is particularly to be noted that the trays are so designed that if any tray should happen to be placed in a stack in inverted position, the longitudinal wires 64 engaging the rails 55—55 will hold the frame a sufficient distance above the lugs 65 so that no engagement will be effected.

By reason of this improved handling apparatus the cooked doughnuts are deposited in a single layer on trays without any incidental manual handling and since they are thus arranged subsequent processing such as glazing, icing, etc. can be performed without removing the doughnuts from the tray, each tray full being handled as a unit.

While reference has been made throughout the foregoing specification to doughnuts the term is used by way of example only and it will be understood that in its broadest aspect the invention is equally useful for crullers or any other food product that can be cooked while floating in a heated cooking oil.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a handling apparatus for cooked doughnuts and the like, a frame structure, parallel rails carried by said structure, a fixed ledge extending above said rails transversely thereof in vertically spaced relation thereto for supporting the rear end of a tray the forward end of which is supported on said rails, whereby the tray is positioned in inclined relation to said rails, said ledge and said rails affording a support at all times for a stack of trays when imposed thereon, an endless tray conveyor having an upper portion extending beneath but contiguous said rails and moveable in the direction of the length thereof, tray engaging lugs on said conveyor projecting upwardly therefrom, means for moving said conveyor in a direction to advance the lugs on the upper portion thereof beneath a tray supported on said ledge and rails from the rear end thereof on said ledge toward the forward end supported on said rails; said ledge being spaced above said conveyor so that the lugs pass therebeneath and said rails being spaced above said conveyor less than the height of said lugs so that the forward end of a tray imposed on said rails will be supported thereby at all times previous to and during its engagement and advance by said lugs, said lugs being engageable with the end of the tray initially seated on said rails to advance the tray on said rails when the conveyor is in motion.

VIRGIL E. ACKLES.

REFERENCES CITED

The following references are of record in the file of this patent:

UNITED STATES PATENTS

| Number | Name | Date |
|---|---|---|
| 467,710 | Ruger | Jan. 26, 1892 |
| 612,773 | Harton | Oct. 18, 1898 |
| 623,185 | Schinneller | Apr. 18, 1899 |
| 930,673 | Manischewitz | Aug. 10, 1909 |
| 1,669,015 | Oliver | May 8, 1928 |
| 1,798,728 | Delvin | Mar. 31, 1931 |
| 1,891,319 | Stayton | Dec. 20, 1932 |
| 1,892,790 | Smelser | Jan. 3, 1933 |
| 2,079,778 | Thom | May 11, 1937 |
| 2,279,420 | Thum | Apr. 14, 1942 |